United States Patent [19]

Yamashita et al.

[11] Patent Number: 4,622,614
[45] Date of Patent: Nov. 11, 1986

[54] MAGNETIC ERASING HEAD

[75] Inventors: Keitaro Yamashita, Zama; Keizo Tsuneki, Yokohama, both of Japan

[73] Assignee: Sony Corporation, Tokyo, Japan

[21] Appl. No.: 564,202

[22] Filed: Dec. 22, 1983

[30] Foreign Application Priority Data

Dec. 29, 1982 [JP] Japan ................................ 57-233193

[51] Int. Cl.[4] ............................................. G11B 5/27
[52] U.S. Cl. ..................................... 360/118; 360/66; 360/121
[58] Field of Search .................... 360/118, 119–121, 360/66, 123, 125–126

[56] References Cited

U.S. PATENT DOCUMENTS 4,180,835 12/1979 Okumura et al. .................. 360/118
4,205,356 5/1980 Tanaka et al. ..................... 360/118

Primary Examiner—John H. Wolff
Assistant Examiner—David J. Severin
Attorney, Agent, or Firm—Lewis H. Eslinger; Alvin Sinderbrand

[57] ABSTRACT

A magnetic erasing head of a double effective gap type which has gaps different in width to each other, includes a magnetic center core having a predetermined width positioned between the gaps and a winding for inducing a magnetic flux. An erasing signal is supplied to the winding, and a wavelength of the erasing signal having a predetermined relationship relative to a width of the magnetic center core.

8 Claims, 10 Drawing Figures

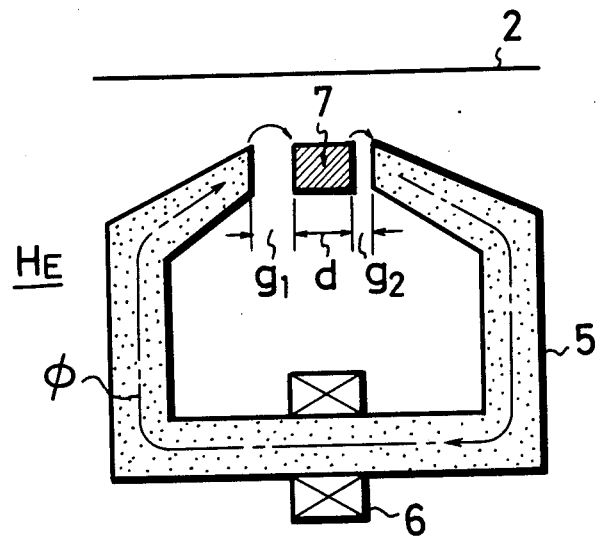
FIG. 2
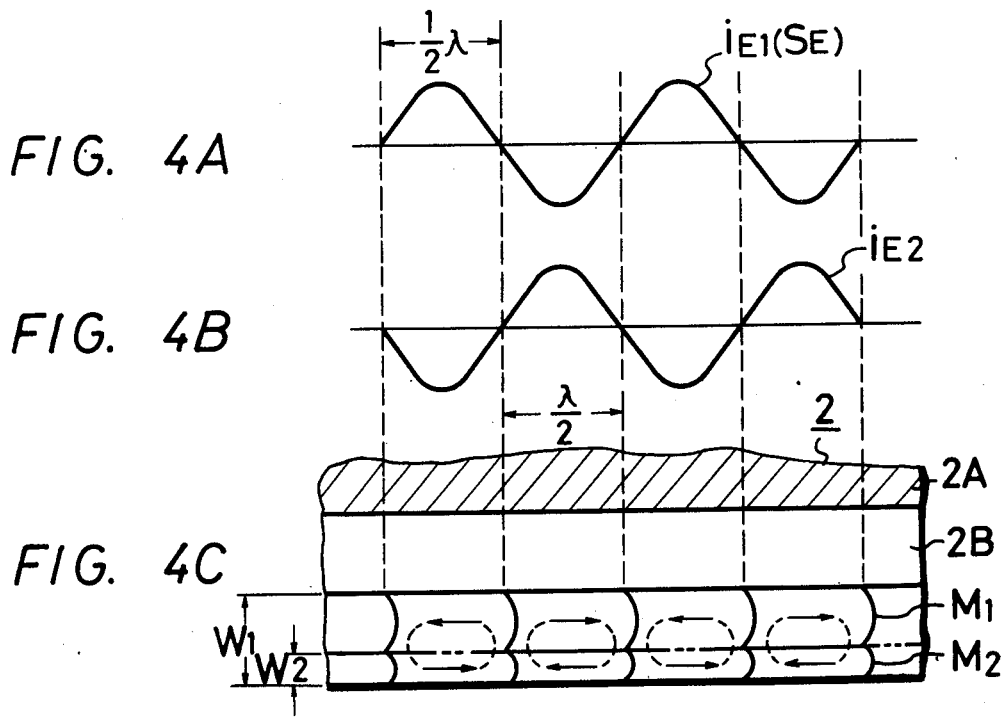
FIG. 4A
FIG. 4B
FIG. 4C

MAGNETIC ERASING HEAD

BACKGROUND OF THE INVENTION

1. Field of the Invention

The present invention relates generally to a magnetic erasing transducer head and more particularly to a rotary magnetic erasing transducer head suitable for use on various kinds of video tape recorders (VTRs).

2. Description of the Prior Art

As, for example, shown in FIG. 1, when a pair of rotary magnetic heads $H_A$ and $H_B$ are mounted on a rotary drum 1 with an angular distance of approximately 180° therebetween and a helical video track is formed on a magnetic tape 2 which is wound around the rotary drum 1 with a wrapping angle of approximately 180°, it is proposed to erase such video track by using a rotary magnetic head.

By way of example, as shown in FIG. 1, a rotary erasing head $H_E$ is mounted on the rotary drum 1 with a predetermined angular distance relative to one recording and/or reproducing rotary magnetic head $H_A$ by which a plurality of tracks can be erased simultaneously.

If the frequency of an erasing signal which is supplied to the rotary erasing head is high (a practical value is different depending on the kinds of the VTR sets), due to the core loss of the rotary head and so on, much power is required for the signal erasure. On the contrary, if the frequency of the erasing signal is selected low, the magnetization level by the erasing signal recorded on the magnetic tape is high and the wavelength of the erasing signal is long. Accordingly, unless the azimuth angle of the rotary erasing head relative to the recording and/or reproducing rotary magnetic head is selected to be considerably large, due to the azimuth loss, the level of the reproduced erasing signal can not be reduced. In practice, it is not so easy to produce the rotary erasing head having a large azimuth angle so that the level of the reproduced erasing signal can not be reduced so much, thus making an S/N (signal-to-noise) ratio poor and hence deteriorating the picture quality.

In the above case, when a magnetic tape having a high coercive force $H_c$ is used or a tracking pilot signal (a single mode signal with the frequency of 100 to 150 kHz) is recorded together with a video signal, much more erasing power is necessary so that the influence due to the reproduced erasing signal becomes stronger.

In U.S. Pat. No. 4,205,356, there is disclosed a double gap type or semi-double gap type erasing head in which after the erasing, the distortion ratio of the recorded signal can be reduced. However, in U.S. Pat. No. 4,205,356, a relation between the gap and the erasing frequency was not referred to. In view of such aspect, it is considered that more desired erasing could not be attained yet.

OBJECTS AND SUMMARY OF THE INVENTION

Accordingly, it is an object of the present invention to provide an improved magnetic erasing transducer head which can overcome the defects inherent in the prior art magnetic erasing transducer head.

It is another object of the present invention to provide a magnetic erasing transducer head which can reduce its erasing power.

It is still another object of the present invention to provide a magnetic erasing transducer head which can suppress the influence of a reproduced erasing signal.

It is further object of the present invention to provide a magnetic erasing transducer head which can raise the erasing efficiency by small erasing power.

It is still a further object of the present invention to provide a magnetic erasing transducer head which can raise an S/N (signal-to-noise) ratio thereby to improve the picture quality.

It is yet a further object of the present invention to provide a magnetic erasing transducer head which is suitable for use with a video tape recorder (VTR).

According to one aspect of the present invention, there is provided a magnetic erasing head used for a video tape recorder comprising:

(a) magnetic head core means having first and second end portions which oppose each other to form a gap therebetween in spaced-apart relationship in a first direction;

(b) magnetic center core means situated between said first and second end portions and being out of contact therewith; to form first and second effective gaps between said first and second end portions of said magnetic head core means respectively said magnetic center core means having a predetermined width a width of said first effective gap being selected wider than that of said second effective gap, said first and second effective gaps being positioned at preceeding and succeeding positions relative to a recording medium respectively;

(c) winding means for inducing a magnetic flux in said first and second effective gaps; and (d) means for generating an erasing signal which is supplied to said winding means, said erasing signal having a predetermined frequency relative to said predetermined width of said magnetic center core means.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 is a cross-sectional diagram showing an embodiment of a rotary magnetic erasing transducer head of semi-double gap type according to the present invention;

FIG. 3 and FIGS. 4A to 4C are respectively diagrams used to explain the operation of the rotary magnetic erasing transducer head shown in FIG. 2;

DESCRIPTION OF THE PREFERRED EMBODIMENTS

Figure 1:
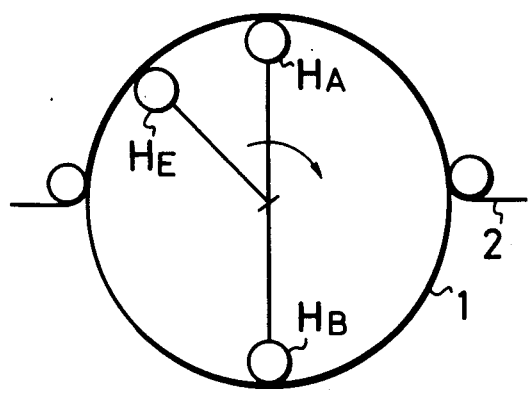
FIG. 1 is a diagram of a rotary magnetic head assembly useful for explaining the present invention.

Now, the magnetic erasing transducer head according to the present invention will hereinafter be described in detail with reference to FIG. 2 and the following. In the embodiments, the present invention is applied to the rotary magnetic head assembly shown in FIG. 1.

FIG. 2 is a cross-sectional diagram showing an example of a rotary magnetic erasing transducer head $H_E$ according to the invention. In this embodiment, the rotary magnetic erasing transducer head $H_E$ is constructed as the semi-double gap type. Namely, around a head core 5 is wound a signal winding 6 and center core means such as a center shim 7 is interposed between both the magnetic poles or ends of the head core 5. Although the center shim 7 is formed by different methods depending on its length d, the center shim 7 can be formed by employing a method such as bonding thin plates, sputtering and the like.

Two effective gaps are formed by the interposition of the center shim 7 between the magnetic poles of the head core 5. If the gap which precedes the center shim 7 relative to the rotation direction of the head $H_E$ is taken as $g_1$ and the gap which succeeds the center shim 7 relative thereto is taken as $g_2$, a relation between the two gaps $g_1$ and $g_2$ is selected so as to satisfy $$g_1 > g_2 \quad (1)$$

When the relation between the gaps $g_1$ and $g_2$ is selected as described above and an erasing current is flowed to the signal winding 6, the erasing efficiency can be raised by the double erasing performed by the gaps $g_1$ and $g_2$. Namely, the recorded signal on the tape 2 can be erased with a small erasing power.

Figure 3:
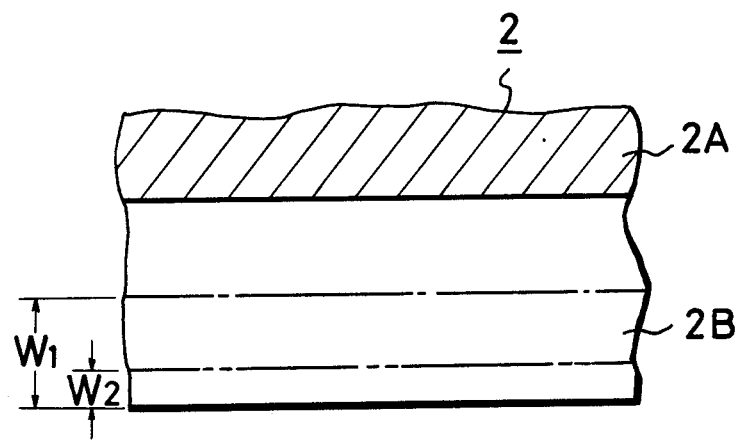

Since the main erasing of the signal is carried out by the magnetic field induced across the gap $g_1$, the value of the erasing current supplied to the winding 6 is determined in such a manner that the magnetic field generated by the gap $g_1$ may become a magnetic field enough for erasing the recorded signal. A depth $w_1$ of magnetization in a magnetic layer 2B of the magnetic tape 2 caused by the magnetic field $h_1$ generated from the gap $g_1$ at that time is shown by a one-dot chain line in FIG. 3. As seen in the above, the large gap $g_1$ brings about a relatively deep magnetization in the magnetic layer 2B. In FIG. 3, reference numeral 2A designates a substrate or base of the tape 2 on which the magnetic layer 2B is formed.

On the other hand, since the succeeding gap $g_2$ satisfies the condition of $g_2 < g_1$, the magnetization formed by a magnetic field $h_2$ ($h_2 = h_1$) generated by the gap $g_2$ does not become so deep but as shown, for example, by a two-dot chain line in FIG. 3, only the surface region of the magnetic layer 2B is magnetized. In this case, the depth of the magnetization is represented by $w_2$.

According to the invention, the double erasing by the two gaps $g_1$ and $g_2$ is carried out and the length of the center shim 7 is selected in such a manner that a residual magnetic flux (residual magnetism) on the tape 2 caused by the erasing signal may be reduced to substantially zero. More particularly, the length d or the center shim 7 is selected relative to a wavelength $\lambda$ of the erasing signal determined by the kind of the VTR set is selected so as to satisfy.

$$d \simeq (n + \tfrac{1}{2})\lambda \quad (2)$$

where n is an integer.

The value of the erasing signal is selected in consideration of the frequency band of the video signal to be processed, a relative speed between the tape and the head, and the level of erasing noise based on the residual magnetic flux on the tape caused by the erasing signal, further as well as the restriction of upper and lower limit values of the above erasing frequency and so on. Accordingly, in a certain VTR set, when the wavelength $\lambda$ of the erasing signal is selected as, for example, 1 μm, the erasing frequency becomes 3.8 MHz or 10 MHz.

When the length d of the center shim 7 is selected to satisfy the equation (2), if the erasing signal $S_E$ supplied to the signal winding 6 changes as shown in FIG. 4A, an erasing current $i_{E1}$ which changes the same way as in the erasing signal $S_E$ is flowed through the gap $g_1$. Therefore, a magnetization pattern $M_1$ as shown in FIG. 4C is formed thereby in the magnetic layer 2B.

Since the gap $g_2$ is distant apart from the gap $g_1$ by the length d as shown in FIG. 2, when the same point is moved from the gap $g_1$ to the gap $g_2$, an erasing current $i_{E2}$ flowing through the gap $g_2$ becomes opposite in phase relative to the erasing current $i_{E1}$ as shown in FIG. 4B. Because, with the semi-double type construction, under the same signal current, the direction or the magnetic field becomes the same as shown by an arrow $\phi$ in FIG. 2.

As a result, if the magnetization pattern by the erasing current $i_{E1}$ is expressed as given by $M_1$ in FIG. 4C, the magnetization pattern by the erasing current $i_{E2}$ is presented such that as shown by a reference character $M_2$ in FIG. 4C, the magnetization pitch thereof becomes the same as that by the erasing current $i_{E1}$ but only the magnetization direction thereof becomes opposite in phase. Consequently, within the tape 2, there is formed a closed loop as indicated by the broken line so that the residual magnetism based on the erasing current does not appear outside. As a result, even when the tape 2 is reproduced by the head, the reproduced erasing signal becomes zero and thereby no deterioration of the S/N ratio is caused by the reproduced erasing signal.

In the case of the double erasing, when the relation is not selected so as to satisfy the equation (2), the perfect closed loop is not formed within the tape 2 so that the erasing noise due to the residual magnetism is produced.

As described above, when the double erasing is performed and the length d of the center shim 7 is selected so as to satisfy the equation (2), the residual magnetism due to the erasing current does not occur outside of the tape 2. Thus, no erasing noise appears and hence the S/N ratio of the video signal can be improved.

Figure 5:
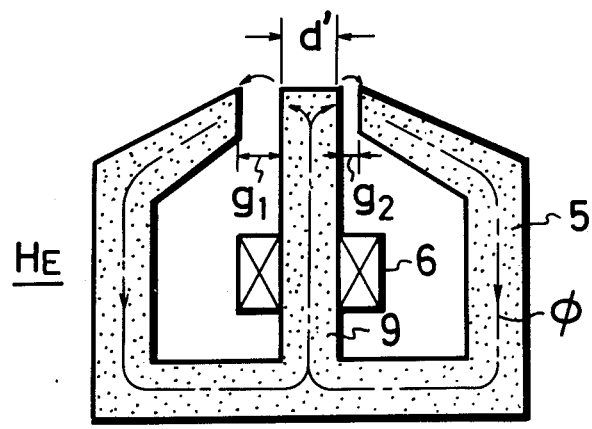
FIG. 5 is a cross-sectional diagram showing another embodiment of a rotary magnetic erasing transducer head of double gap type according to the present invention.

FIG. 5 shows a case in which the present invention is applied to a magnetic erasing transducer head of double gap type. As shown in FIG. 5, there is provided, at the center of the head core 5, a magnetic center core 9. Around this magnetic center core 9 is wound the signal winding 6 and the magnetic gap formed between both ends of the head core 5 is divided into two gaps $g_1$ and $g_2$ by the tip or top end of the magnetic center core 9.

The relation between the two gaps $g_1$ and $g_2$ is selected so as to satisfy the condition of $g_1 > g_2$ similarly as above, while, the length or width d' of the magnetic center core 9, unlike the equation (2), is selected so as to satisfy the equation as given by $$d' = n\lambda \quad (3)$$

Figure 6A:
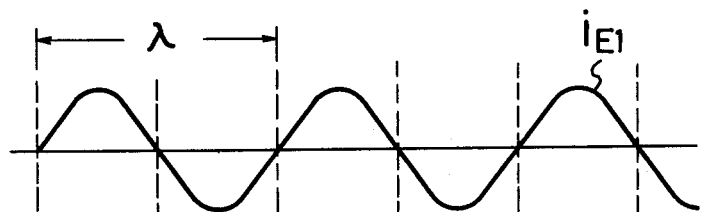
FIGS. 6A to 6C are respectively diagrams used to explain the operation thereof.
Figure 6B:
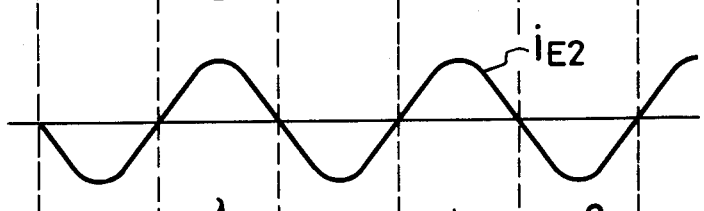

The reason for this will be described below. In the magnetic erasing transducer head of double gap type, even when the same erasing current is supplied to the winding 6, the direction of the magnetization formed by the gap $g_1$ and the direction of the magnetization formed by the gap $g_2$ are inverted to each other. Accordingly, if the equation (3) is satisfied, the erasing current $i_{E1}$ which flows through the gap $g_1$ and the erasing current $i_{E2}$ which flows through the gap $g_2$ also become opposite to each other in phase (refer to FIGS. 6A and 6B) so that the magnetization directions of the tape 2 thereby become opposite in polarity.

Figure 6C:
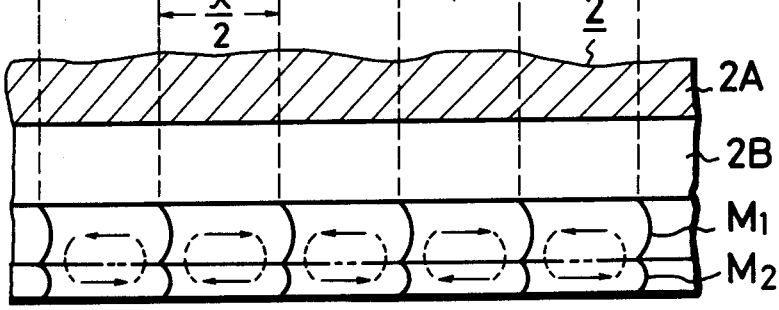

With the construction thus made, the closed loop is formed by the residual magnetic fluxes generated in the upper and lower magnetic layers 2B of the tape as shown in FIG. 6C, so that the same effect as above can be achieved.

As set forth above, according to the present invention, owing to the double erasing method, the erasing efficiency can be raised with small erasing power and the residual magnetic flux components on the tape caused by the erasing signal are reduced substantially to zero. As a result, no erasing noise is generated and hence the S/N ratio is increased so much, thus the picture quality is improved.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A semi-double gap magnetic erasing head comprising:
   magnetic head core means having first and second end portions which oppose each other in spaced apart relationship;
   magnetic center core means formed as a separate element of diverse material from said head core means and having at least a portion thereof situated between said first and second end portions and being out of contact therewith;
   a first effective magnetic gap formed between said portion of said magnetic center core means and said first end portion of said magnetic head core means;
   a second effective magnetic gap formed between said portion of said magnetic center core means and said second end portion of said magnetic head core means;
   said portion of said magnetic center core means situated between said first and second end portions having a predetermined width relative to said gaps, the width of said first effective gap being selected to be wider than the width of said second effective gap;
   winding means associated with said magnetic head core means for inducing a magnetic flux in said first and second effective magnetic gaps; and
   means for generating an erasing signal which is supplied to said winding means, said erasing signal having a frequency determined so that a relationship between the wavelength of said frequency of said erasing signal and said width of said magnetic center core means situated between said first and second end portions is selected so as to satisfy the following equation:

$$d \simeq (n+\tfrac{1}{2})\lambda$$

wherein
   n: an integer
   d: width of the magnetic center core
   λ: wavelength of the erasing signal.

2. A magnetic erasing head according to claim 1, in which said magnetic erasing head is used on a video tape recorder.

3. A magnetic erasing head according to claim 1, in which said magnetic erasing head is mounted on a rotary drum and a record medium is wound around said rotary drum for movement therewith, and said first and second effective gaps are positioned at preceding and succeeding positions, respectively, relative to the movement of said record medium.

4. A magnetic erasing head according to claim 3, in which a depth of magnetization on said record medium caused by a magnetic field generated by said magnetic flux in said first effective gap is deeper than a depth of magnetization caused by a magnetic field generated by said magnetic flux in said second effective gap.

5. A double gap magnetic erasing head comprising:
   magnetic head core means having first and second end portions which oppose each other in spaced apart relationship;
   magnetic center core means integrally formed with said magnetic head core means and having at least a portion of said magnetic center core means situated between said first and second end portions and being out of contact therewith;
   a first effective magnetic gap formed between said portion of said magnetic center core means and said first end portion of said magnetic head core means;
   a second effective magnetic gap formed between said portion of said magnetic center core means and said second end portion of said magnetic head core means;
   said portion of said magnetic center core means situated between said first and second end portions having a predetermined width relative to said gaps, the width of said first effective gap being selected to be wider than the width of said second effective gap;
   winding means associated with said magnetic head core means for inducing a magnetic flux in said first and second effective magnetic gaps; and
   means for generating an erasing signal which is supplied to said winding means, said erasing signal having a frequency determined so that a relationship between the wavelength of said frequency of said erasing signal and said width of said magnetic center core means is selected so as to satisfy the following equation:

$$d \simeq n\lambda$$

wherein
   n: an integer
   d: width of the magnetic center core
   λ: wavelength of the erasing signal.

6. A magnetic erasing head according to claim 5, in which said magnetic erasing head is used on a video tape recorder.

7. A magnetic erasing head according to claim 5, in which said magnetic erasing head is mounted on a rotary drum and a record medium is wound around said drum for movement therewith, and said first and second effective gaps are positioned at preceding and succeeding positions, respectively, relative to the movement of said record medium.

8. A magnetic erasing head according to claim 7, in which a depth of magnetization on said recording medium by a magnetic field generated by said magnetic flux in said first effective gap is deeper than a magnetization caused by a magnetic field generated by said magnetic flux in said second effective gap.

* * * * *